(12) United States Patent
Weaver et al.

(10) Patent No.: US 11,731,376 B2
(45) Date of Patent: Aug. 22, 2023

(54) METHOD OF MANUFACTURING AN OBJECT FROM A COMPOSITE MATERIAL AND AN OBJECT FORMED THEREBY

(71) Applicant: APPLIED GRAPHENE MATERIALS UK LIMITED, Redcar (GB)

(72) Inventors: William Weaver, Redcar (GB); Matthew David Sharp, Redcar (GB); Gaven Johnson, Redcar (GB); Antony Xavier Gallafent, Redcar (GB)

(73) Assignee: APPLIED GRAPHENE MATERIALS UK LIMITED, Redcar (GB)

( * ) Notice: Subject to any disclaimer, the term of this patent is extended or adjusted under 35 U.S.C. 154(b) by 13 days.

(21) Appl. No.: 17/046,645

(22) PCT Filed: Apr. 9, 2019

(86) PCT No.: PCT/GB2019/051035
§ 371 (c)(1),
(2) Date: Oct. 9, 2020

(87) PCT Pub. No.: WO2019/197823
PCT Pub. Date: Oct. 17, 2019

(65) Prior Publication Data
US 2021/0162685 A1    Jun. 3, 2021

(30) Foreign Application Priority Data
Apr. 9, 2018 (GB) ..................... 1805858

(51) Int. Cl.
| | | |
|---|---|---|
| *B32B 5/02* | (2006.01) | |
| *B32B 27/06* | (2006.01) | |
| *B32B 27/20* | (2006.01) | |
| *B32B 27/38* | (2006.01) | |
| *B32B 27/18* | (2006.01) | |
| *B05C 1/04* | (2006.01) | |
| *B05C 5/00* | (2006.01) | |
| *B29C 70/30* | (2006.01) | |
| *B29C 70/06* | (2006.01) | |
| *B29C 70/22* | (2006.01) | |

(52) U.S. Cl.
CPC .............. *B29C 70/30* (2013.01); *B32B 5/02* (2013.01); *B32B 27/06* (2013.01); *B32B 27/20* (2013.01); *B32B 2255/02* (2013.01); *B32B 2255/26* (2013.01); *B32B 2260/021* (2013.01); *B32B 2260/046* (2013.01); *B32B 2264/108* (2013.01); *B32B 2305/30* (2013.01)

(58) Field of Classification Search
None
See application file for complete search history.

(56) References Cited

U.S. PATENT DOCUMENTS

| | | | |
|---|---|---|---|
| 7,981,501 B2 | 7/2011 | Kwag et al. | |
| 2012/0164900 A1 | 6/2012 | Reichwein et al. | |
| 2014/0323633 A1 | 10/2014 | Megaridis et al. | |
| 2015/0064458 A1 | 3/2015 | Sarkar et al. | |
| 2018/0304598 A1* | 10/2018 | Drzal | ........................ F41H 1/08 |
| 2018/0370096 A1 | 12/2018 | Fuchs et al. | |

FOREIGN PATENT DOCUMENTS

| | | |
|---|---|---|
| CN | 106346871 A | 1/2017 |
| CN | 106671525 A | 5/2017 |
| CN | 107225814 A | 10/2017 |
| CN | 107351486 A | 11/2017 |
| DE | 102015109597 A1 | 1/2017 |
| EP | WO2011015288 A1 | 2/2011 |
| EP | 2345528 A2 | 7/2011 |
| EP | 2384884 A1 | 11/2011 |
| KR | 20160084977 A | 7/2016 |
| WO | WO2015030953 A1 | 3/2015 |

OTHER PUBLICATIONS

Search Report for GB Appl. No. 1805858.6 dated Dec. 5, 2018, 8 pages.
International Search Report and Written Opinion for PCT/GB2019/051035 dated Jul. 18, 2019, 12 pages.

(Continued)

*Primary Examiner* — Sheeba Ahmed
(74) *Attorney, Agent, or Firm* — Lee & Hayes, P.C.

(57) ABSTRACT

A method of manufacture of an object 4 from a fibre and or fabric reinforced composite material 12 comprising at least a first layer of a proof coating 10, a first matrix, and one or more fibre and or fabric reinforcement materials, characterised in that the manufacture steps comprise a) creating a first layer of the proof coating 10, b) laying up a mixture of the fibre and or fabric reinforcement material and the composite matrix form a composite element 12, in which (i) step (a) is performed first with the first layer of the proof coating 10 being applied to a mould 2 or support, followed by step (b) with layup being performed on a surface of the first layer of the proof coating 10 of step (a); or (ii) step (b) is performed first with layup being performed on a mould 2 or support, followed by step (a) with the first layer of the proof coating 10 being applied to at least one surface of the composite element 12 of step (b) characterised in that the proof coating 10 is comprised of a second matrix having dispersed therein 2D nanomaterial platelets.

13 Claims, 2 Drawing Sheets

(56) References Cited

OTHER PUBLICATIONS

The Chinese Office Action dated Dec. 29, 2021 for Chinese application counterpart foreign application of U.S. Appl. No. 17/046,645, receieved Jan. 24, 2022 Weaver,William "A Method of Manufacturing an Object From a Composite Material and an Object Formed Thereby" 10 pages.

The Great Britian Office Action dated Mar. 31, 2022 for GB application counterpart foreign application of U.S. Appl. No. 17/046,645, receieved May 12, 2022 Weaver,William "A Method of Manufacturing an Object From a Composite Material and an Object Formed Thereby" 3 pages.

The Singapore Office Action dated Sep. 2, 2021, for Singapore Applicators No. 11202009061W, a counterpart foreign application of U.S. Appl. No. 17/046,645, 7 pages.

* cited by examiner

METHOD OF MANUFACTURING AN OBJECT FROM A COMPOSITE MATERIAL AND AN OBJECT FORMED THEREBY

CROSS REFERENCE TO RELATED APPLICATIONS

This application is a US national stage entry of International Patent Application No. PCT/GB2019/051035, filed Apr. 9, 2019, which claims priority to GB1805858.6, filed Apr. 9, 2018, the entire contents of each of which are incorporated by reference herein.

BACKGROUND OF THE DISCLOSURE

This invention relates to composite materials. In particular, this application relates to fibre/fabric reinforced composite materials with improved service life relative to known fibre/fabric reinforced composite materials.

Fibre/fabric reinforced composite materials are well known and are comprised of fibres and or fabric bonded within a matrix. The most well known fibres and fabrics used in composite materials are glass fibre and fabrics or cloths made with glass fibres and carbon fibre and fabrics or cloths made with carbon fibres. Other types of fibre and fabrics or cloths made therefrom, both man-made and organic, are, however, known to be used in fibre and or fabric reinforced composite materials. More than one type of fibre and or fabric can be used in a composite material. The choice of the fibre(s) and or fabric(s) to be used in a composite material is often determined by mechanical requirements or economics.

The matrix in a fibre and or fabric reinforced composite material is typically a polyester resin, a vinyl ester resin or an epoxy resin. The choice of the type of resin used will depend, at least in part, on the proposed use of the object to be made from the composite material, the desired mechanical properties of the composite material and the different costs of the various resins. The matrix is combined with the fibre and or fabric reinforcement by known techniques so that once the matrix is cured the fibre and or fabric reinforcement is bonded within the matrix.

It is often the case that objects made from fibre and or fabric reinforced composite materials also comprise a coating of a gelcoat covering at least one surface of the object. Typically, a gel coat covers the or each surface of the object that is expected to be exposed to the most damaging environmental conditions. Such damaging environmental conditions include but are not limited to exposure to liquids such as water, that exposure can be constant (for example the hull of a boat) or intermittent (for example a bath or liquid storage tank).

Gelcoats are typically thermosetting polymers based on epoxy or unsaturated polyester resin chemistry and may contain pigments for aesthetic reasons. Gelcoats are designed to be durable and provide resistance to ultraviolet degradation and hydrolysis, but they do not contribute in any significant fashion to the structural properties of the composite material.

Fibre and or fabric reinforced composite materials are a material of choice in many applications due to the ability of objects and structures manufactured from such materials to be manufactured to a lower weight and with fewer components than would typically be the case for traditional building materials such as metal. The mechanical properties of such composite materials are determined by the strength and rigidity of the fibres and or fabric reinforcement, the strength and rigidity of the matrix, the strength of the interface between the fibre and or fabric and the matrix, and environmental conditions such as temperature.

An object or structure made from a fibre and or fabric reinforced composite material is, when in use or installed, typically exposed to one or more environmental conditions which might reduce the mechanical integrity of the material either immediately or over time. Such environmental conditions need to be taken into account when designing the object or structure and the composite material with which to manufacture the object or structure. Typically, this will result in a design that utilizes higher performance materials or thicker sections than would otherwise be required in order to allow for a reduction in mechanical performance of the composite material as a result of the environmental conditions.

A typical environmental condition that has an effect on the mechanical properties of a fibre and or fabric reinforced composite material is exposure to water and or other liquids, especially when such exposure is frequent or for prolonged periods of time. This is because the materials that comprise the matrix and gelcoat, are permeable and as such water and or other liquids can migrate through the material over time.

It is frequently the case that there are free volumes or voids in the fibre and or fabric reinforced composite material. These voids may be the result of gaps between and within the molecules of the matrix and or gelcoat, manufacturing defects such as entrapped air bubbles, cracks, and or dry fibre and or fabric (that is fibre and or fabric not saturated with the matrix material). Once water and or other liquids have permeated through the matrix and or gelcoat it will build up in these voids.

The presence of and build-up of water and or other liquids within the structure of fibre and or fabric reinforced composite materials is expected to lead to reversible and irreversible changes and or damage to the fibre and or fabric, the matrix, and or the interface between the fibre and or fabric and the matrix.

For the matrix, the reversible changes that may occur are:
Swelling of the matrix material;
and the irreversible changes/damage that may occur are:
Chemical break-down of the matrix by the process of hydrolysis;
Chemical breakdown of the matrix resultant from stress induced effects associated with swelling and applied stress;
Chemical composition changes to the material of the matrix resultant from leaching;
Formation of surface cracks and crazes as a result of non-uniform shrinkage following water uptake and loss.

For the fibre and or fabric, the irreversible changes/damage that may occur are:
Corrosion which will result in a loss of strength;
Leaching which will result in a loss of strength.

For the interface between the fibre and or fabric and the matrix, the reversible changes that may occur are:
Plasticization/an increase in the flexibility of the matrix adjacent the surface of the fibre and or the surface of the fibre and or fabric resulting in a loss of strength of the bond between the matrix and the fibre and or fabric;
and the irreversible changes/damage that may occur are:
Chemical break-down of the matrix/fibre and or fabric bond by the process of hydrolysis;
Debonding due to internally generated stresses associated with swelling and shrinking.

Hydrolysis is particularly damaging to fibre and or fabric reinforced composite materials because once water and or other liquids have entered a void in the composite material, any water-soluble materials in the void or adjacent the void will enter the water in solution. This will then cause an osmotic gradient between the solution in the void and any moisture on the surface of the composite material. As a result, further water will be drawn into the void as a result of osmosis. This will lead to the solution applying pressure to the composite material and may result in delamination and or the formation of blisters in the composite material.

The damaging effect of water and or other liquids increases with an increase in temperature.

The steps typically involved with the manufacture of an object from a fibre and or fabric reinforced composite material are known and will, at least in part, depend on the nature of the object to be made and the matrix and fibre and or fabric reinforcement used. The object manufactured may be a mould for use in the manufacture of other objects or products, a product, or a structure. Examples of such products, without limiting the field in which the present invention is of utility, may include structural components of boats, road vehicles and aeroplanes; liquid containment vessels such as storage tanks, baths, hot tubs, swimming pools; and turbine blades.

Some of the steps typically involved with the manufacture of an object from a fibre and or fabric reinforced composite material are as follows:

A suitable mould for use in shaping the composite material is obtained. The mould may be a male or female mould. With a male mould the composite material is formed around the outside of the mould. With a female mould the composite material is formed inside the mould.

A release agent is applied to the surface of the mould on which the composite material is to be formed. Such release agents are known.

The surface of the mould on which the composite material is to be formed may optionally then have one or more coatings of a gelcoat applied to it. Typically, the application is by brushing, rolling or spraying. The desired thickness of the gelcoat is typically between 0.30 mm and 0.56 mm (0.012 inch to 0.022 inch) but other thicknesses may be appropriate. The gelcoat is then allowed to cure. For clarity of expression it is to be understood that the outer surface or outer face of the gelcoat is proximal to the surface of the mould and the inner surface or inner face of the gelcoat is remote from the surface of the mould.

Once the gelcoat, if applied, has sufficiently advanced in cure, layup of the fibre and or fabric reinforcement over the inner surface of the gelcoat occurs using known techniques. If no gelcoat is being used, layup of the fibre and or fabric reinforcement over the surface of the mould occurs using known techniques.

The fibre and or fabric reinforcement may be in the form of a prepreg (a fibre and or fabric reinforcement that is impregnated with the matrix ready for curing by the application of appropriate curing conditions, for example a sufficiently high temperature), or in the form of fibre and or fabric to which a liquid matrix has been applied prior to being put in place or to which a liquid matrix is applied after the fibre and or fabric has been put in place. Sufficient fibre and or fabric is used to achieve the desired thickness of composite material.

Once all of the fibre and or fabric have been put in place, the matrix is allowed to cure or subjected to conditions that will cause it to cure dependent on the particular matrix used.

Once the matrix has cured, the object is removed from the mould. That object may be ready for use or may require further processing.

BRIEF DESCRIPTION OF THE DRAWINGS

The detailed description is described with reference to the accompanying drawings.

Figure 1:
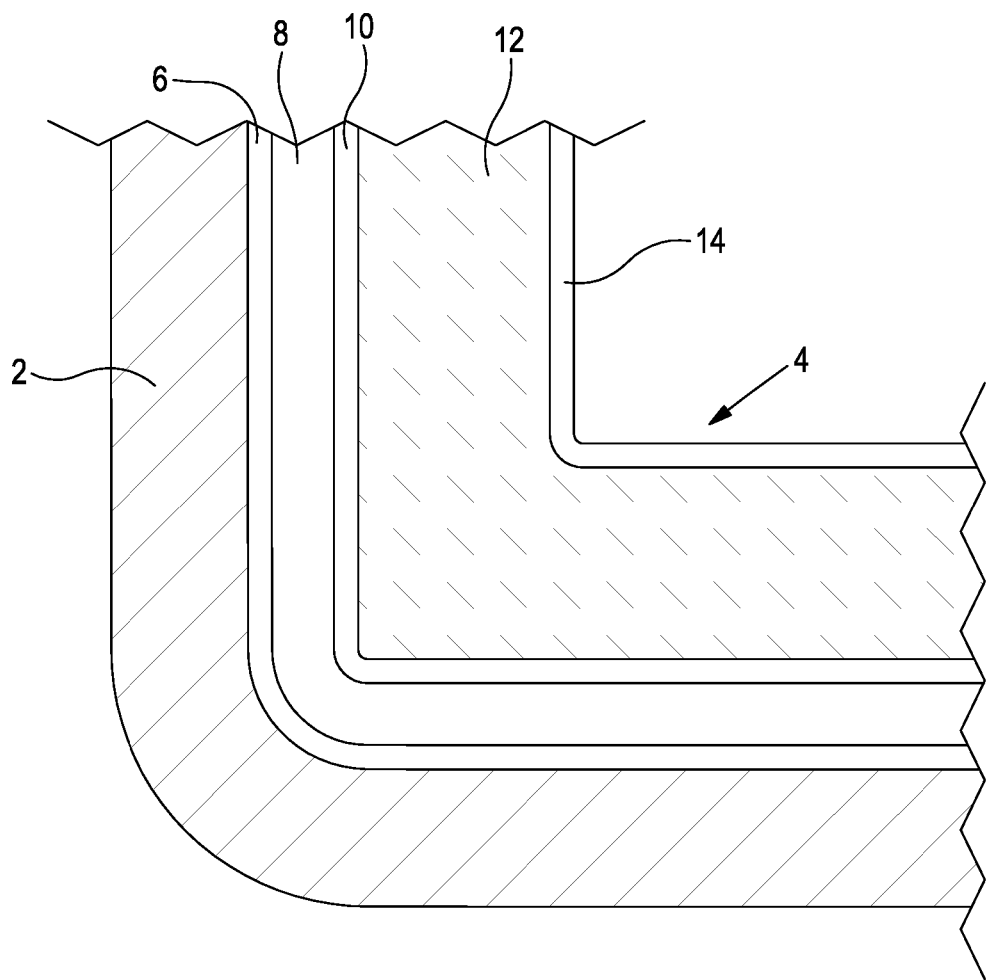
FIG. 1 shows a partial schematic section through a mould and an embodiment of an object according to the present invention within that mould.

According to a first aspect of the present invention there is provided a method of manufacture of an object from a fibre and or fabric reinforced composite material comprising at least a first layer of a proof coating, a first or composite matrix, and one or more fibre and or fabric reinforcement materials, characterised in that the manufacture steps comprise a) forming a first layer of the proof coating, and
b) laying up a mixture of the fibre and or fabric reinforcement material and the composite matrix form a composite element, in which (i) step (a) is performed first with the first layer of the proof coating being applied to a mould or support, followed by step (b) with layup being performed on a surface of the first layer of the proof coating of step (a); or (ii) step (b) is performed first with layup being performed on a mould or support, followed by step (a) with the first layer of the proof coating being applied to at least one surface of the composite element of step (b)

characterised in that the proof coating is comprised of a second matrix having dispersed therein 2D nanomaterial platelets.

In some embodiments of the present invention, the 2D nanomaterial platelets of the proof coating comprise one or a mixture of graphene nanoplates and graphite flakes in which the graphite flakes have one nanoscale dimension and 35 or less layers of atoms (simply referred to as "layers"). In some embodiments the graphene nanoplates comprise one of or a mixture of two or more of graphene, graphene oxide, and/or reduced graphene oxide nanoplates, bilayer graphene, graphene oxide, and/or reduced graphene oxide nanoplatelets, and few-layer graphene, graphene oxide, and/or reduced graphene oxide nanoplatelets.

In some embodiments of the present invention, the 2D nano-material platelets comprise one or a mixture of graphene (C) nanoplates, graphene oxide nanoplates, reduced graphene oxide nanoplates, graphite flakes in which the graphite flakes have one nanoscale dimension and 35 or less layers, hexagonal boron nitride (hBN) nanoplates, molybdenum disulphide ($MoS_2$) nanoplates, tungsten diselenide ($WSe_2$) nanoplates, silicene (Si) nanoplates, germanene (Ge) nanoplates, graphyne (C) nanoplates, borophene (B) nanoplates, phosphorene (P) nanoplates, or a 2D in-plane heterostructure of two or more of the aforesaid materials.

In some embodiments of the present invention, the 2D nano-materials comprise Layered 2D materials which comprise one or a mixture of graphite flakes in which the graphite flakes have one nanoscale dimension and 35 or less layers, multi-layered graphene (C) nanoplates, multi-layered graphene oxide nanoplates, multi-layered reduced graphene oxide nanoplates, multi-layered hexagonal boron nitride (hBN) nanoplates, multi-layered molybdenum disulphide ($MoS_2$) nanoplates, multi-layered tungsten diselenide ($WSe_2$) nanoplates, multi-layered silicene (Si) nanoplates, multi-layered germanene (Ge) nanoplates, multi-layered graphyne (C) nanoplates, multi-layered borophene (B) nanoplates, multi-layered phosphorene (P) nanoplates, or a 2D vertical heterostructure of two or more of the aforesaid materials.

As discussed above, epoxy resins and other materials that are suitable for use as the composite matrix for the present invention will, after a relatively short period of exposure to water or humidity, become saturated with water which can exacerbate the effects of hydrolysis on composite materials. The mechanism of hydrolysis is well known and does not need to be discussed herein.

It has been found in general research on graphene that a graphene film can effectively decouple a metallic substrate on which the film is deposited from the environment. It has been shown that a single atomic and defect free film of graphene is impermeable to gas, water and dissolved gasses and ions in that water. It has however been estimated that in the presence of a defect density of 1 $um^{-2}$ water transportation through graphene can occur at speeds of >1 m/s. Such mass transport rates can account for the observed corrosion effects on metals.

Graphene has many forms and growth of a film by CVD (Chemical Vapor Deposition) is well understood and can give rise to graphene films of 1-3 atomic layers. Such films are used in most experimentation in connection with graphene. Such techniques have limited commercial applicability because they enable only relatively small areas of film to be created or substrate to be coated. In commercial applications it is more typical for graphene to be used in the form of graphene nanoplates (also known as nanoplatelets). Graphene nanoplatelets may be produced by either exfoliation of graphite or via synthetic solvothermal processes. Such graphene nanoplatelets may vary substantially in number of atomic layers, surface area, functionality and $sp^2$ content. Such variations impact on the physical properties of the graphene such as the conductivity of the graphene. Likewise, graphite flakes with nanoscale dimensions and 40 or less layers of carbon atoms, graphite flakes with nanoscale dimensions and 25 to 30 layers of carbon atoms, graphite flakes with nanoscale dimensions and 20 to 35 layers of carbon atoms, graphite flakes with nanoscale dimensions and 25 to 35 layers of carbon atoms, or graphite flakes with nanoscale dimensions and 20 to 40 layers of carbon atoms may be produced by either exfoliation of graphite or via synthetic solvothermal processes.

Epoxy resins and other materials that are suitable for use as the second matrix of the present invention will, after a relatively short period of exposure to water, humidity, and or other liquids become saturated with water and or other liquids.

Figure 2:
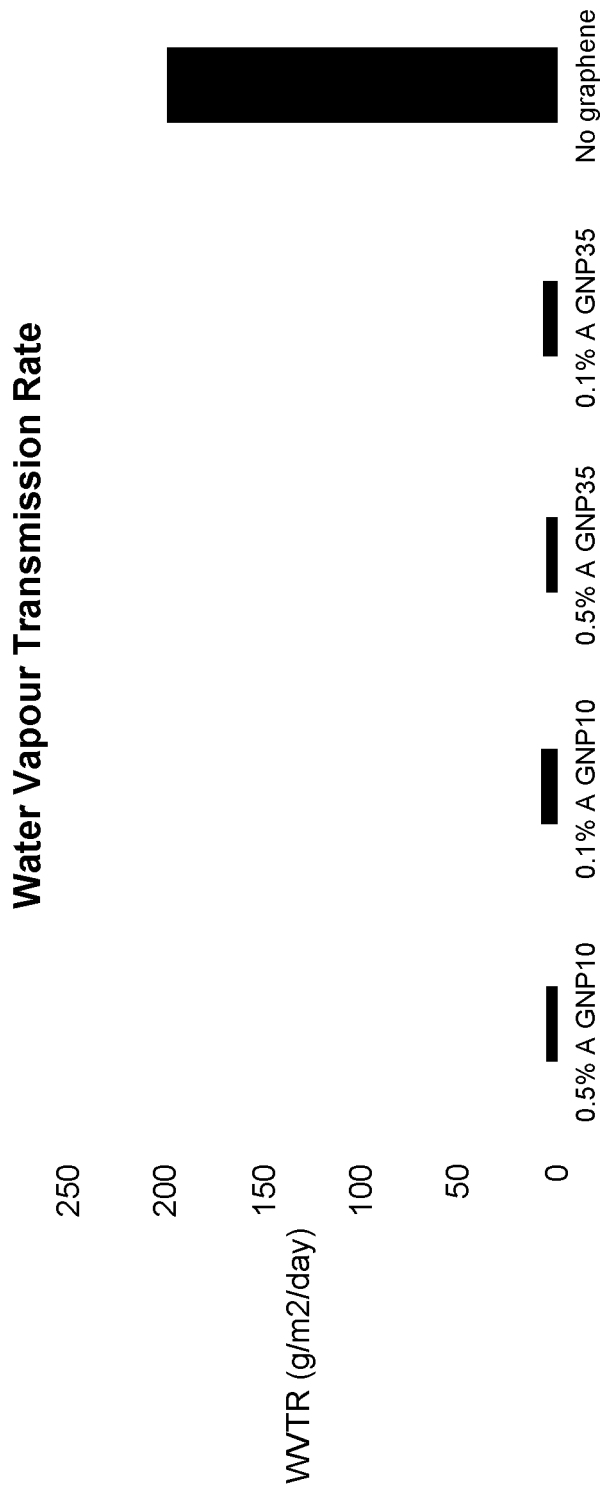
FIG. 2 shows the results of a test of water vapour transmission rate for a coating comprising two types of commercially available graphene/graphitic platelets and a control.

The dispersal of 2D nanomaterial platelets in the second matrix to form the proof coating of the present invention will, depending on the applied dry film thickness of the proof coating layer, result in multiple layers of 2D nanomaterial platelets in that layer. Each platelet is potentially several atomic layers thick. The presence of multiple layers of 2D nanomaterial platelets in the proof coating provides a complex and tortuous (labyrinthine) path for the penetration of water and or other liquids. This labyrinthine path significantly reduces the diffusion rate of water and or other liquids and substances dissolved in the water through the second matrix and hence across the proof coating layer. This is evidenced by the results of a test of water vapour transmission rate for a coating comprising two types of commercially available graphene/graphitic platelets (A-GNP35 which has 6-14 layers of carbon atoms and A-GNP10 which has 25 to 35 layers of carbon atoms, both available from Applied Graphene Materials Plc) and a control. The results are shown in FIG. 2.

Graphene/graphitic platelets typically have a thickness of between 0.3 nm and 12 nm and lateral dimensions ranging from around 100 nm to 100 μm. As a result, and because of the graphene/graphitic platelet's high lateral aspect and surface area, a coating layer comprised of graphene/graphitic platelets dispersed in the second matrix may be relatively thin. As a result, the coating is unlikely to have any significant effect on the mechanical properties of the composite element of the present invention.

In some embodiments of the present invention, the 2D nanomaterial platelets are graphene/graphitic platelets and have a D50 particle size of less than 45 μm, less than 30 μm, or less than 15 μm as measured by a Mastersizer 3000.

An advantage of employing the method of manufacture according to the first aspect of the present invention is that the rate of permeation of water or other liquid into the composite or structural element of the object being manufactured, the fibres and or fabrics bonded in the composite matrix, is significantly reduced. This will have the effect that the damage to the structural properties of the object from water and or other liquids will also be significantly reduced. This leads to an increased life span for the object manufactured employing the method of manufacture according to the first aspect of the present invention. This also leads to the designer of an object being able to include less material in the design because they do not have to compensate for the damage expected from the water and or other liquid. The use of less material will lead to less materials being used in an object with the environmental and economic benefits that brings. It will also lead to lighter objects which is again likely to lead to environmental and economic benefits.

In some embodiments of the first aspect of the present invention, the manufacture steps further comprise c) forming a layer of a gelcoat in which (iii) step (c) is performed first with the gelcoat being applied to a mould or support, followed by step (a) with the proof coating being formed on a surface of the gelcoat, followed by step (b) with layup being performed on a free surface of the proof coating; or (iv) step (b) is performed first with layup being performed on a mould or support, followed by step (a) with the first layer of the proof coating being applied to at least one surface of the composite element of step (b), followed by step (c) with the gelcoat being applied to a free surface of the proof coating.

A free surface of a coating, layer or composite element is one which is not overlaid by a coating, layer or composite element.

It is beneficial in these embodiments to include a gelcoat layer because although it is known that gelcoats are permeable, especially as the gelcoats age, the use of a gelcoat helps to physically protect the proof coating layer. Use of a gelcoat can also give aesthetic benefits in terms of colour and or surface finish. A further advantage of a gelcoat layer is that although it becomes permeable, it is when permeable flow rate limiting for water or other liquids.

It is known that there are a number of different methods of manufacturing objects from composite materials. It is, however the case that, in general terms those currently known techniques all result in objects the structural element of which is fibres and or fabrics bonded in a matrix. That structural element is liable to weakened by permeation of water and or other liquids. The method of manufacture of the first aspect of the present invention includes the incorporation of at least one proof coating layer which acts as a barrier to permeation of that water or other liquid into the fibres and or fabrics bonded in a matrix.

In some embodiments of the first aspect of the present invention, the manufacture steps comprise creation of at least two proof coating layers. In some of these embodiments, the manufacture steps comprise creating second and optionally further layers of the proof coating, with each layer of proof coating overlying different surfaces of the composite element.

These embodiments are particularly beneficial where more than one surface of the object being manufactured is expected to be exposed to water and or other liquids. In some embodiments the method of application of the first and second proof coating layers may be different to suit the nature of the fibres and or fabrics bonded in the composite matrix and the exact method of manufacture.

In some embodiments of the first aspect of the present invention, the manufacture steps further comprise overlaying at least one proof coating layer with at least one further proof coating layer. The proofing layers may be of different compositions relative to each other. This approach offers even greater resistance to permeation by water or other liquids than a single proof coating layer. The proof coating layers may be separated from each other by an intermediate layer. The intermediate layer may be of a material suitable for use in separating the proof coating layers.

In some embodiments of the first aspect of the present invention, the or each layer of proof coating is created by brushing, spraying or printing. The proof coating may be applied to the surface of a mould, the surface of a gelcoat layer, or the surface of the fibres and or fabrics bonded in the composite matrix which may be in the form of prepreg, tape or tow or fibre and where manufacturing methods include prepreg layup, hand layup automatic tape layup, filament winding, resin transfer moulding (RTM) including flexible RTM, Continuous RTM, Vacuum assisted RTM, High Speed RTM, and pultrusion. Similarly, the proof coating may be applied to the surface of a mould, the surface of a gelcoat layer of composite products manufactured using short or discontinuous fibre where manufacturing includes chopped strand spray layup, sheet moulding compound and bulk moulding compound.

In some embodiments of the first aspect of the present invention, the proof coating layer has a thickness in the range of 5 µm to 100 µm, 5 µm to 50 µm, 10 µm to 30 µm, 25 µm to 100 µm or 40 µm to 60 µm.

In some embodiments of the first aspect of the present invention, the proof coating is comprised of 0.1 wt % to 0.5 wt % of 2D nanomaterial platelets.

In some embodiments of the first aspect of the present invention, the composite matrix is comprised of one or more thermoset matrices, an unsaturated polyester resin, an orthophthalic polyester resin, a terephthalic polyester resin, an lsophthalic polyester resin, a dicyclopentadiene polyester resin, a chlorendic polyester resin, a vinyl ester resin, an epoxy resin, a cyanate ester, a bismaleimide, a urethane acrylate, a phenolic, a furan or poly(furfuralalcohol), a polyimide, a benzoxazine and mixtures and combinations thereof.

In some embodiments of the first aspect of the present invention, the second matrix is comprised of suitable crosslinkable resins, epoxy resin, a polyester resin, a vinyl ester resin, acrylics, aminoplasts, urethanes, carbamates, alkyds, silicones, polyureas, silicates, polydimethyl siloxanes, vinyl esters, unsaturated polyesters, an orthophthalic polyester resin, a terephthalic polyester resin, an lsophthalic polyester resin, a dicyclopentadiene polyester resin, a chlorendic polyester resin, phenolics, furans or poly(furfurylalcohols), polyimides, bezoxazines and suitable non-crosslinkable resins mixtures and combinations thereof.

In some embodiments of the first aspect of the present invention, the proof coating further comprises a hardener. Such hardeners are known and ensure that the second matrix in the proof coating properly cures.

According to a second aspect of the present invent invention there is provided an object constructed from a fibre and or fabric reinforced composite material characterised in that the object is comprised of a composite element and a proof coating layer in which the composite element is formed from a mixture of the fibre and or fabric reinforcement material and the composite matrix, and the proof coating is comprised of a second matrix having dispersed therein 2D nanomaterial platelets.

In some embodiments of the present invention, the 2D nanomaterial platelets of the proof coating comprise one or a mixture of graphene nanoplates and graphite flakes in which the graphite flakes have one nanoscale dimension and 35 or less layers of atoms (simply referred to as "layers"). In some embodiments the graphene nanoplates comprise one of or a mixture of two or more of graphene, graphene oxide, and/or reduced graphene oxide nanoplates, bilayer graphene, graphene oxide, and/or reduced graphene oxide nanoplatelets, and few-layer graphene, graphene oxide, and/or reduced graphene oxide nanoplatelets.

In some embodiments of the present invention, the 2D nanomaterial platelets comprise one or a mixture of graphene (C) nanoplates, graphene oxide nanoplates, reduced graphene oxide nanoplates, graphite flakes in which the graphite flakes have one nanoscale dimension and 35 or less layers, hexagonal boron nitride (hBN) nanoplates, molybdenum disulphide ($MoS_2$) nanoplates, tungsten diselenide ($WSe_2$) nanoplates, silicene (Si) nanoplates, germanene (Ge) nanoplates, graphyne (C) nanoplates, borophene (B) nanoplates, phosphorene (P) nanoplates, or a 2D in-plane heterostructure of two or more of the aforesaid materials.

In some embodiments of the present invention, the 2D nanomaterials comprise Layered 2D materials which comprise one or a mixture of graphite flakes in which the graphite flakes have one nanoscale dimension and 35 or less layers, multi-layered graphene (C) nanoplates, multi-layered graphene oxide nanoplates, multi-layered reduced graphene oxide nanoplates, multi-layered hexagonal boron nitride (hBN) nanoplates, multi-layered molybdenum disulphide ($MoS_2$) nanoplates, multi-layered tungsten diselenide ($WSe_2$) nanoplates, multi-layered silicene (Si) nanoplates, multi-layered germanene (Ge) nanoplates, multi-layered graphyne (C) nanoplates, multi-layered borophene (B) nanoplates, multi-layered phosphorene (P) nanoplates, or a 2D vertical heterostructure of two or more of the aforesaid materials.

Objects according to the second aspect of the present invention have the same advantages and benefits as objects made according to the methods of the first aspect of the present invention.

In some embodiments of the second aspect of the present invention, the object further comprises a layer of a gelcoat and in which a proof coating layer is between the gelcoat layer and the composite element.

In some embodiments of the second aspect of the present invention, the object comprises at least two proof coating layers.

In some embodiments of the second aspect of the present invention, the object comprises a second proof coating layer in which the first and second proof coating layers overlie first and second surfaces of the composite element.

In some embodiments of the second aspect of the present invention, each proof coating layer is created by brushing, spraying or printing.

In some embodiments of the second aspect of the present invention, the proof coating layer has a thickness in the range of 5 μm to 100 μm, 5 μm to 50 μm, 10 μm to 30 μm, 25 μm to 100 μm or 40 μm to 60 μm, 25 μm to 100 μm or 40 μm to 60 μm.

In some embodiments of the second aspect of the present invention, the proof coating is comprised of 0.1 wt % to 0.5 wt % of 2D nanomaterial platelets.

In some embodiments of the second aspect of the present invention, the composite matrix is comprised of one or more thermoset matrices, an unsaturated polyester resin, an orthophthalic polyester resin, a terephthalic polyester resin, an lsophthalic polyester resin, a dicyclopentadiene polyester resin, a chlorendic polyester resin, a vinyl ester resin, an epoxy resin, a cyanate ester, a bismaleimide, a urethane acrylate, a phenolic, a furan or poly(furfuralalcohol), a polyimide, a benzoxazine and mixtures and combinations thereof.

In some embodiments of the second aspect of the present invention, the second matrix is comprised of suitable cross-linkable resins, epoxy resin, a polyester resin, a vinyl ester resin, acrylics, aminoplasts, urethanes, carbamates, alkyds, silicones, polyureas, silicates, polydimethyl siloxanes, vinyl esters, unsaturated polyesters, an orthophthalic polyester resin, a terephthalic polyester resin, an lsophthalic polyester resin, a dicyclopentadiene polyester resin, a chlorendic polyester resin, phenolics, furans or poly(furfurylalcohols), polyimides, bezoxazines and suitable non-crosslinkable resins mixtures and combinations thereof.

In some embodiments of the second aspect of the present invention, the proof coating further comprises a hardener.

In some embodiments of the second aspect of the present invention, the object is a mould for use in the making of objects from composite materials.

According to a third aspect of the present invention there is provided a proof coating for use in the method of manufacture according to the first aspect of the present invention and the object according to the second aspect of the present invention characterised in that the proof coating is comprised of 0.1 wt % to 0.5 wt % of 2D nanomaterial platelets.

In some embodiments of the present invention, the 2D nanomaterial platelets of the proof coating comprise one or a mixture of graphene nanoplates and graphite flakes in which the graphite flakes have one nanoscale dimension and 35 or less layers of atoms (simply referred to as "layers"). In some embodiments the graphene nanoplates comprise one of or a mixture of two or more of graphene, graphene oxide, and/or reduced graphene oxide nanoplates, bilayer graphene, graphene oxide, and/or reduced graphene oxide nanoplatelets, and few-layer graphene, graphene oxide, and/or reduced graphene oxide nanoplatelets.

In some embodiments of the present invention, the 2D nano-material platelets comprise one or a mixture of graphene (C) nanoplates, graphene oxide nanoplates, reduced graphene oxide nanoplates, graphite flakes in which the graphite flakes have one nanoscale dimension and 35 or less layers, hexagonal boron nitride (hBN) nanoplates, molybdenum disulphide ($MoS_2$) nanoplates, tungsten diselenide ($WSe_2$) nanoplates, silicene (Si) nanoplates, germanene (Ge) nanoplates, graphyne (C) nanoplates, borophene (B) nanoplates, phosphorene (P) nanoplates, or a 2D in-plane heterostructure of two or more of the aforesaid materials.

In some embodiments of the present invention, the 2D nano-materials comprise Layered 2D materials which comprise one or a mixture of graphite flakes in which the graphite flakes have one nanoscale dimension and 35 or less layers, multi-layered graphene (C) nanoplates, multi-layered graphene oxide nanoplates, multi-layered reduced graphene oxide nanoplates, multi-layered hexagonal boron nitride (hBN) nanoplates, multi-layered molybdenum disulphide ($MoS_2$) nanoplates, multi-layered tungsten diselenide ($WSe_2$) nanoplates, multi-layered silicene (Si) nanoplates, multi-layered germanene (Ge) nanoplates, multi-layered graphyne (C) nanoplates, multi-layered borophene (B) nanoplates, multi-layered phosphorene (P) nanoplates, or a 2D vertical heterostructure of two or more of the aforesaid materials.

Objects manufactured using a proof coating according to the third aspect of the present invention have the same advantages and benefits as objects manufactured according to the methods of the first aspect of the present invention.

In some embodiments of the third aspect of the present invention, the proof coating is comprised of 0.1 wt % to 0.5 wt % of graphene/graphitic nanoplates of 6 to 14 layers of carbon atoms or graphite flakes with nanoscale dimensions and 25 to 35 layers of carbon atoms.

In some embodiments of the third aspect of the present invention, the second matrix is comprised of suitable cross-linkable resins, epoxy resin, a polyester resin, a vinyl ester resin, acrylics, aminoplasts, urethanes, carbamates, alkyds, silicones, polyureas, silicates, polydimethyl siloxanes, vinyl esters, unsaturated polyesters, an orthophthalic polyester resin, a terephthalic polyester resin, an lsophthalic polyester resin, a dicyclopentadiene polyester resin, a chlorendic polyester resin, phenolics, furans or poly(furfurylalcohols), polyimides, bezoxazines and suitable non-crosslinkable resins mixtures and combinations thereof.

In some embodiments of the third aspect of the present invention, the proof coating further comprises a hardener.

According to a fourth aspect of the present invention there is provided use of a proof coating according in the method of manufacture according to the first aspect of the present invention.

According to a fifth aspect of the present invention there is provided a kit comprising a quantity of a proof coating according to the fourth aspect of the present invention, and instructions for use of that proof coating in the method of manufacture according the first aspect of the present invention.

The present invention will be further described and explained by way of example and with reference to the accompanying drawing in which the FIG. 1 shows a partial schematic section through a mould and an embodiment of an object according to the present invention within that mould.

With reference to the FIG. 1, a partial section of a mould 2 is shown. Within the mould is an object 4 made from a composite material.

The object 4 is made or manufactured in the following fashion:

A layer of a release agent 6 is applied to the inside face of the mould 2 using a spray applicator. This allows the finished object 4 to be removed from the mould 2 with ease.

The release agent 6 is a commercially available release agent suitable for use in association with the composition of the gelcoat 8.

A layer of a gelcoat 8 is applied to the surface or face of the layer of release agent 6 remote from the mould 2 using a spray applicator. The layer of the gelcoat 8 is allowed to at least partially cure. The gelcoat layer 8 is a commercially available gelcoat suitable for use in association with the composition of the proof coating 10.

Once the layer of the gelcoat 8 has at least partially cured, a layer of the proof coating 10 is applied to the face of the gelcoat layer 8 remote from the mould 2 using a brush. The proof coating layer 10 is allowed to at least partially cure. The proof coating 10 is comprised of a second matrix in the form of an epoxy resin in which between 0.1 wt % and 0.5 wt % of graphene/graphitic nanoplates of 6 to 14 layers of carbon atoms or graphite flakes with nanoscale dimensions and 25 to 35 layers of carbon atoms is dispersed. The dried/cured thickness of the proof coating layer 10 is between 5 µm and 50 µm.

Once the proof coating layer 10 is at least partially cured, reinforcement fibres mixed with the composite matrix to make a composite 12 are placed against the face of the proof coating layer 10 remote from the mould 2 using known hand layup techniques. The composite layer 12 is allowed to at least partially cure. The reinforcement fibres are carbon fibres and the composite matrix is a resin chosen to give the desired mechanical properties to the object 4. The material of the first and second matrix may be the same but are more likely different given the different roles of each matrix.

Once the composite layer 12 has at least partially cured a second proof coating layer 14 is applied to the surface of the composite layer 12 remote from the mould 2. The second proof coating layer 14 is applied by spraying and is of the same composition as first proof coating layer 10. Again, the average thickness of the second proof coating layer 14 was between 5 µm and 50 µm.

Once all the layers have cured sufficiently for the object 4 to be removed from the mould 2 without damage it is removed from the mould 2.

In instances where the object 4 does not include a gelcoat 8 the first proof coating layer 10 is applied to the surface of the mould 2.

It will be understood that for other manufacturing methods the proof coating may be applied to the surface of the continuous fibres and or fabrics bonded in the composite matrix which may be in the form of prepreg, tape or tow or fibre and where manufacturing methods include prepreg lay up, hand lay up automatic tape lay up, filament winding, resin transfer moulding (RTM) including flexible RTM, Continuous RTM, Vacuum assisted RTM, High Speed RTM, and pultrusion. The coated fibres and or fabrics are then used in the same manner as uncoated fibres and or fabrics are currently used.

Within the scope of this application it is expressly intended that the various aspects, embodiments, examples and alternatives set out in the preceding paragraphs, and/or in the claims, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

The invention claimed is:

1. An object at least partially constructed from a fibre and or fabric reinforced composite material characterised in that the object is comprised at least a first proof coating layer, a first or composite matrix, and one or more fibre and or fabric reinforcement materials in which fibre and or fabric reinforcement material and the composite matrix form a composite element, and the proof coating is comprised of a second matrix having dispersed therein 2D nanomaterial platelets, wherein the 2D nanomaterial platelets are graphene/graphitic platelets and have a D50 particle size of less than 45 µm, wherein the proof coating comprises multiple layers of 2D nanomaterial platelets providing a labyrinthine path for the penetration of water and/or other liquids.

2. An object according to claim 1 in which the 2D nanomaterial platelets of the proof coating comprise one or a mixture of graphene nanoplates and graphite flakes in which the graphite flakes have one nanoscale dimension and 35 or less layers of atoms.

3. An object according to claim 1 in which the 2D nanomaterial platelets further comprise one or a mixture of graphene (C) nanoplates, graphene oxide nanoplates, reduced graphene oxide nanoplates, graphite flakes in which the graphite flakes have one nanoscale dimension and 35 or less layers, hexagonal boron nitride (hBN) nanoplates, molybdenum disulphide ($MoS_2$) nanoplates, tungsten diselenide ($WSe_2$) nanoplates, silicene (Si) nanoplates, germanene (Ge) nanoplates, graphyne (C) nanoplates, borophene (B) nanoplates, phosphorene (P) nanoplates, multi-layered graphene (C) nanoplates, multi-layered graphene oxide nanoplates, multi-layered reduced graphene oxide nanoplates, multi-layered hexagonal boron nitride (hBN) nanoplates, multi-layered molybdenum disulphide ($MoS_2$) nanoplates, multi-layered tungsten diselenide ($WSe_2$) nanoplates, multi-layered silicene (Si) nanoplates, multi-layered germanene (Ge) nanoplates, multi-layered graphyne (C) nanoplates, multi-layered borophene (B) nanoplates, multi-layered phosphorene (P) nanoplates, or a 2D in-plane or vertical heterostructure of two or more of the aforesaid materials.

4. An object according to claim 1 in which the object further comprises a layer of a gelcoat and in which a proof coating layer is between the gelcoat layer and the composite element.

5. An object according to claim 1 in which the object comprises at least two proof coating layers.

6. An object according to claim 5 in which at least two proof coating layers overlie different surfaces of the composite element.

7. An object according to claim 5 in which at least one proof coating layer is overlaid with a further proof coating layer.

8. An object according to claim 1 in which the proof coating layer has a dried thickness in the range of 5 µm to 100 µm.

9. An object according to claim 1 in which the proof coating is comprised of 0.1 wt % to 0.5 wt % of 2D nanomaterial platelets.

10. An object according to claim 1 in which the composite matrix is comprised of one or more of an unsaturated polyester resin, an orthophthalic polyester resin, a terephthalic polyester resin, an Isophthalic polyester resin, a dicyclopentadiene polyester resin, a chlorendic polyester resin, a vinyl ester resin, an epoxy resin, a cyanate ester, a bismaleimide, a urethane acrylate, a phenolic, a furan or poly (furfuralalcohol), a polyimide, a benzoxazine and mixtures and combinations thereof.

11. An object according to claim 1 in which the second matrix is comprised of one or more of epoxy resin, a polyester resin, a vinyl ester resin, acrylics, aminoplasts, urethanes, carbamates, alkyds, silicones, polyureas, silicates, polydimethyl siloxanes, vinyl esters, unsaturated polyesters, phenolics, furans or poly(furfurylalcohols), polyimides and bezoxazines.

12. An object according to claim 1 in which the proof coating further comprises a hardener.

13. An object according to claim 1 in which the object is a mould for use in the making of objects from composite materials.

\* \* \* \* \*